United States Patent
Roodenrijs

(10) Patent No.: US 6,247,321 B1
(45) Date of Patent: Jun. 19, 2001

(54) METHOD AND APPARATUS FOR FREEZECONCENTRATING SUBSTANCES

(75) Inventor: Jacobus Petrus Roodenrijs, Sint Michielsgestel (NL)

(73) Assignee: Niro Process Technology, B.V. (NL)

( * ) Notice: Subject to any disclaimer, the term of this patent is extended or adjusted under 35 U.S.C. 154(b) by 0 days.

(21) Appl. No.: 09/213,670

(22) Filed: Dec. 17, 1998

(30) Foreign Application Priority Data

Dec. 18, 1997 (NL) .................................................. 1007846

(51) Int. Cl.⁷ ...................................................... B01D 9/04
(52) U.S. Cl. .............................................................. 62/123
(58) Field of Search ........................... 62/532, 544, 123, 62/100, 262

(56) References Cited

U.S. PATENT DOCUMENTS

| | | |
|---|---|---|
| 1,865,614 | 7/1932 | Caldwell et al. . |
| 2,816,821 | * 12/1957 | Weedman et al. ...................... 62/544 |
| 2,833,835 | * 5/1958 | Green et al. ............................. 62/545 |
| 4,004,886 | * 1/1977 | Thijssen et al. ........................ 62/544 |
| 4,372,766 | * 2/1983 | Andrepont ............................... 62/532 |
| 4,459,144 | 7/1984 | Van Pelt et al. . |
| 4,710,215 | * 12/1987 | Kasai et al. ............................. 62/532 |

FOREIGN PATENT DOCUMENTS 30083463  7/1983  (EP) .

OTHER PUBLICATIONS

W.L. Mc–Cabe, J.C. Smith: "Unit Operations of Chemical Engineering", Mc–MGraw–Hill, New York XP002074939, see p. 777, line 13—p. 778, line 9; figures 24–6.

* cited by examiner

Primary Examiner—Ronald Capossela
(74) Attorney, Agent, or Firm—Handal & Morofsky

(57) ABSTRACT

The invention relates to a crystallization apparatus and to a method for crystallizing a liquid from a solution, a mixture of liquids or a suspension. The apparatus comprises a growth zone in a vertically positioned tank, which growth zone is positioned below a nucleation zone. Via a delivery line the seed crystals are fed from the nucleation zone to the bottom end of the growth zone. In the growth zone the ice slurry slowly moves in a vertical direction at such a low velocity that heavier particles are able to precipitate and to be discharged at the bottom end. Preferentially, the nucleation zone comprises a vacuum apparatus for effecting a reduction in pressure in the nucleation zone to between $10^{-4}$ and $7 \cdot 10^{-3}$ bar. Using the apparatus according to the present invention it is possible for waste water and effluent to be concentrated in a simple manner, clogging of, for example, filters owing to the settling of solid particles being prevented.

36 Claims, 3 Drawing Sheets

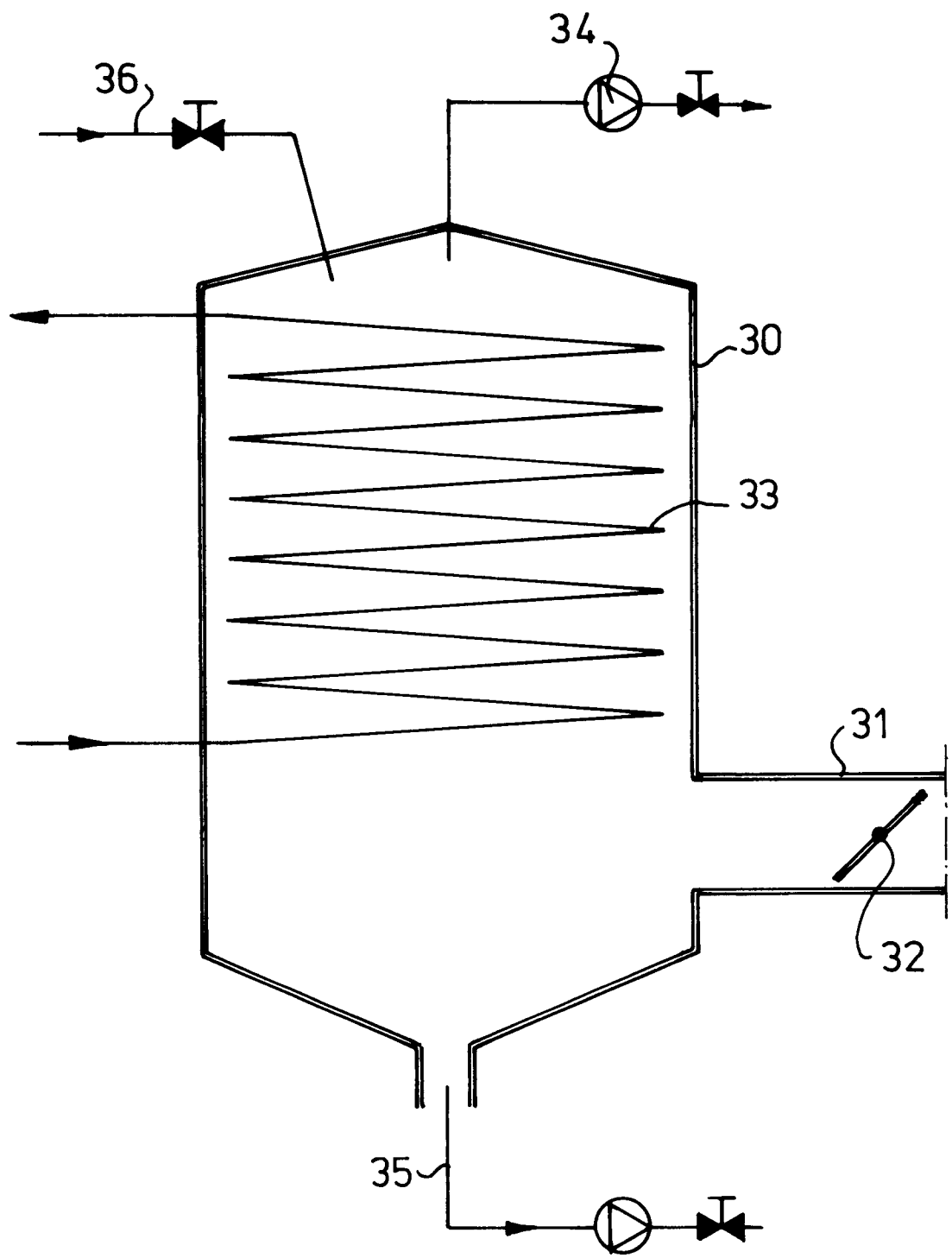

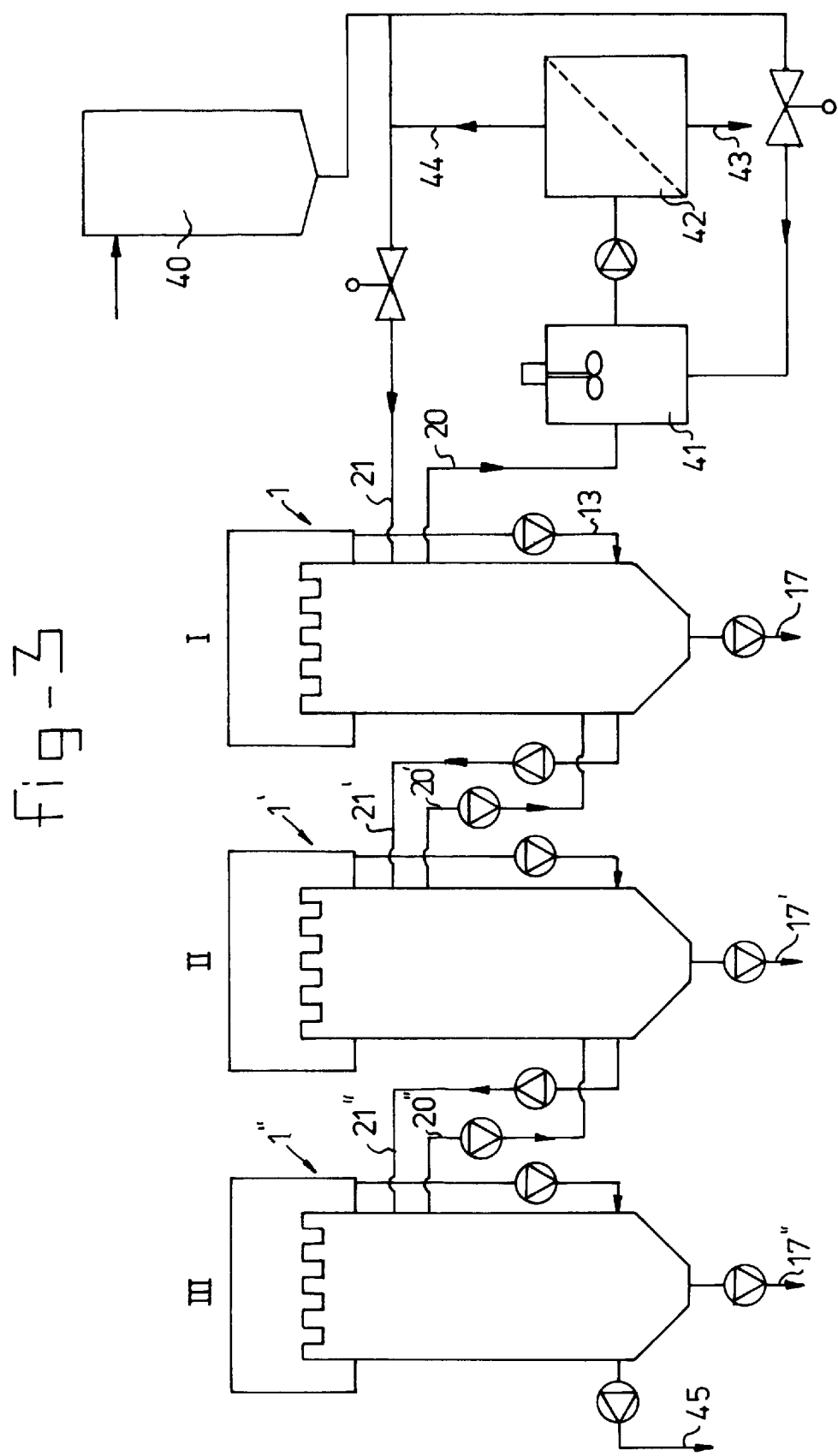

METHOD AND APPARATUS FOR FREEZECONCENTRATING SUBSTANCES

Figure 1:
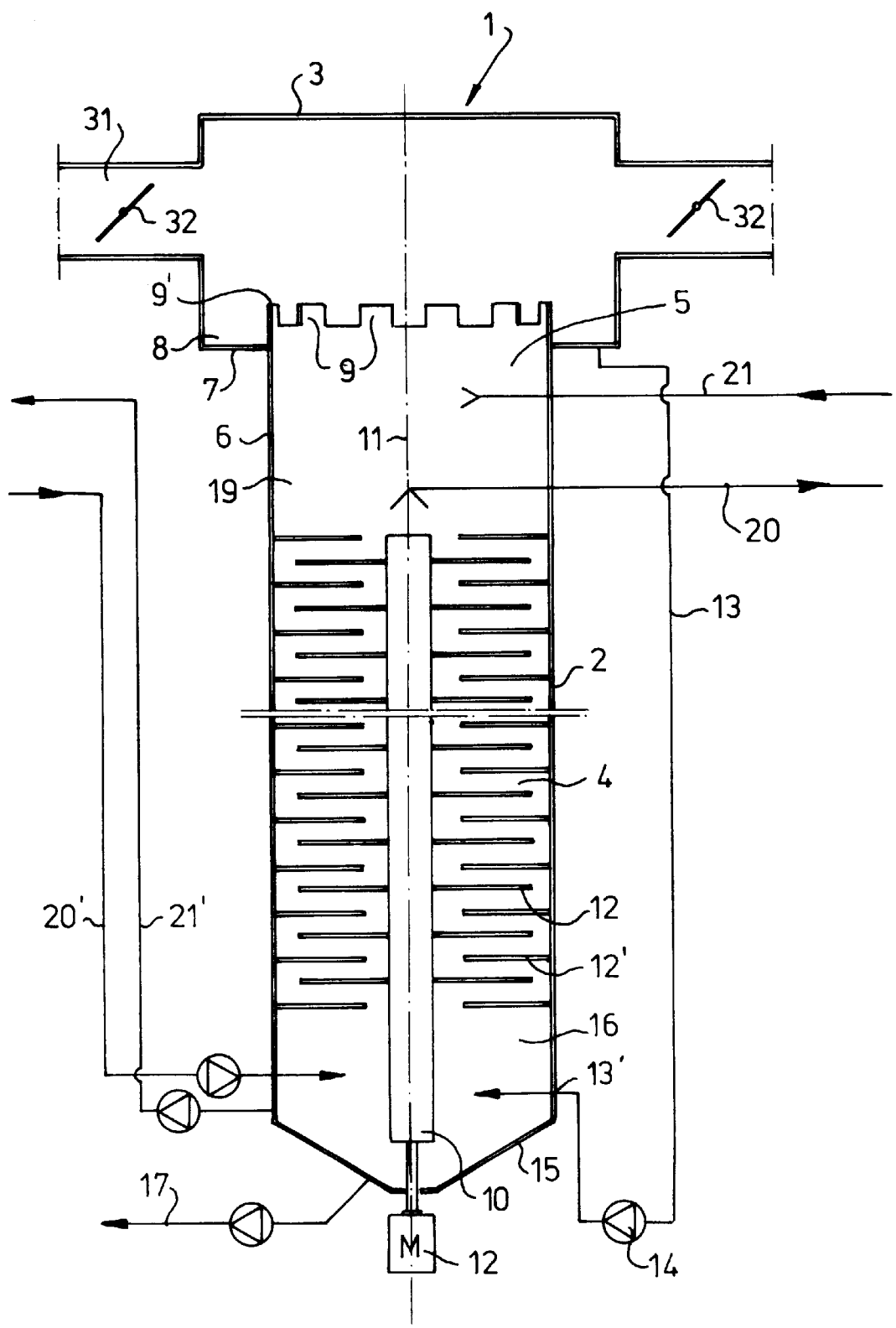

The invention relates to an apparatus for crystallizing a liquid from a solution, a mixture of liquids or a suspension, comprising:
- a nucleation zone with a cooling unit for forming crystals,
- a growth zone which is situated below the nucleation zone and is connected, via a delivery line, to the nucleation zone for feeding a mixture of liquid and crystals to the growth zone, and
- a recycling path between the growth zone and the nucleation zone for mass transfer from the growth zone to the nucleation zone, the growth zone being situated in a tank, which extends along a vertical axis and a topmost end of which comprises the nucleation zone and which, at a bottommost end, is provided with an intake connected to the delivery line, the recycling path being formed by a growth zone section situated between the intake and the nucleation zone.

Such a crystallization apparatus is disclosed by W. L. McCabe, J. C. Smith: "Unit Operations of Chemical Engineering", McGraw-Hill, New York XP002074939, pp. 777–778. This publication demonstrates a vacuum crystallizer including a conical crystallizer vessel having a nucleation zone at its top end and having a constricted and extended bottom end as the growth zone. Positioned in the nucleation zone is a draft tube, in which crystal slurry is drawn in by suction from a propeller. The bottom rim of the vacuum tank extends into the nucleation zone and forms an annular chamber which effects separation between seed crystals and larger crystals. The seed crystals are removed via a bypass and introduced at the bottom end of the growth zone. A crystal slurry discharge line is situated in the centre of the growth zone.

The known apparatus has the drawback that the crystal slurry is pumped over with a high velocity from the nucleation zone to the growth zone with the aid of the propeller or screw, so that the degree of separation between nucleation and growth is low. Furthermore, the known apparatus is operated batchwise rather than continuously. Moreover, with the known apparatus there is the risk that in the event of certain substances becoming concentrated it is possible for sediment to precipitate, which may lead to blockage of the feed of the seed crystals.

American patent application number 4,459,144, in the name of the Applicant, discloses a freeze concentration apparatus comprising three identical stages connected countercurrently. This involves a water-containing substance such as fruit juice, beer, tea or coffee being fed in, in each stage, to a surface-scraped heat exchanger. The surface-scraped heat exchangers form nucleation zones in which seed crystals are formed having a size of between 5 and 10 microns. From the surface-scraped heat exchangers the seed crystals are transferred to a growth zone in a separate adiabatic stirred recrystallizer tank, where the average crystal size increases to about 300 microns. The ice slurry from the recrystallizer tank of the first stage is fed to a separation device for separating the crystals and the solution, which in this case is formed by a wash column. Via a filter in the recrystallizer tank of the first stage, some of the solution is recirculated via the surface-scraped heat exchanger associated with the recrystallizer tank, and some is fed to the second stage of the freezeconcentration apparatus which in turn comprises a surface-scraped heat exchanger as the nucleation zone and a recrystallizer tank as the growth zone. The ice slurry formed in the recrystallizer tank of the second stage is fed to the recrystallizer tank of the first stage, the ice slurry moving countercurrently to the solution. The final concentration of the concentrated product discharged from the third stage can be around 50%.

A further multistage countercurrent freezeconcentration apparatus, where the crystal slurry is transferred via a centrifuge from the recrystallizer tank of the second stage to the recrystallizer tank of a first stage, is disclosed by the Netherlands patent application number 8902621.

In the case of cryoconcentration of foodstuffs using the known multistage countercurrent installations, the concentration factor that can be achieved is determined by the viscosity of the concentrate. However, when industrial waste water like that, for example, released in the production of styrene monomer, propylene oxide or other types of effluent is concentrated, the concentration factor that can be achieved is limited by the dissolved substances in the feed becoming supersaturated. As a result of the concentration of dissolved substances in the separation section, such as the wash column for example, being kept close to the feed concentration, for example owing to the crystal slurry being mixed with the feed, no problems will occur at that point. Downstream of the filters in the recrystallizer, or ripening tanks, however, the velocity is so low that, as concentrations increase, certain substances will precipitate there. This sediment may give rise to blockages. The known freezeconcentration apparatuses are therefore less suitable for a number of substances such as, in particular, industrial waste water or effluent.

It is an object of the present invention to provide an apparatus by means of which aqueous solutions, suspensions or mixtures of substances from which one component readily precipitates as a sediment, can be concentrated in an efficient manner. It is a further object of the present invention to reduce the number of apparatus required for freezeconcentration and the number of rotating parts and to bring about a general simplification of the process conditions, which leads to a relatively inexpensive method and apparatus.

To this end, the apparatus according to the present invention is characterized in that in or near the nucleation zone and/or the top end of the growth zone a liquid feed line is connected into the tank and in that in or near the nucleation zone and/or the top end of the growth zone a crystal slurry discharge line is connected to the tank for discharging crystal slurry from the tank.

During operation of the apparatus according to the invention, the vertically aligned tank containing the growth zone is filled with crystal slurry as far as the nucleation zone. Via the feed line, crystals formed in the nucleation zone are fed, together with the solution, to the bottom end of the growth zone. This causes the ice slurry in the growth zone to be pushed upwards very slowly, at such a low velocity that heavier undissolved fractions can settle on the bottom of the tank and the lighter ice can float up. The sediment can be discharged from the growth zone at the bottom end of the tank. In the apparatus according to the present invention, no filter is required between the growth zone and the nucleation zone as in the case of the freezeconcentration apparatuses according to the prior art. This allows reliable processing of suspensions to take place, without sedimentation of solids resulting in the apparatus becoming blocked.

As a result of the liquid being fed in via the liquid feed line, the level in the ripening tank is maintained, while the discharge of the crystals via the crystal slurry discharge line takes place at such a flow rate, that a constant level of the ice slurry is maintained. As a result, a stirrer, if present, will keep turning continuously in the ice slurry. Owing to the crystal slurry being discharged at the top end of the growth zone, preferably exclusively at the top end of the growth zone, all the nuclei formed are able to be effectively removed by ripening and cannot reach the nucleation zone for a second time.

In one embodiment of the crystallization apparatus according to the present invention, the nucleation zone communicates with the growth zone and is provided with evaporation means for evaporating liquid in the nucleation zone. The term "communicates" refers here to the crystal slurry at the top end of the growth zone being able to move into the nucleation zone without passing an intermediate filter, intermediate pump, system of lines or other component. In the nucleation zone cooling takes place by evaporation of, preferably, a component of the solution, and seed crystals are formed having a size of between 5 and 10 $\mu$m. It is also possible, however, for a separate coolant to be evaporated, such as propane. Preferably, evaporation is effected by a vacuum apparatus which is connected to the nucleation zone to effect a reduction in pressure in the nucleation zone to below the vapour pressure associated with the crystallization temperature. The vacuum apparatus permits uniform and efficient nucleation, one very simple option being that of the growth vessel and the nucleation vessel being designed as a closed vacuum tank. According to one embodiment, the nucleation zone is connected, via a valve, to a condenser for condensing vapour, which is fed to the condenser from the nucleation zone, against a cooling surface of the condenser, and with a pump for discharging uncondensed gases. By evacuating the condenser while the valve is closed and then connecting it to the nucleation zone by opening the valve, vapour is removed from the nucleation zone and condensed against the cooling surface of the condenser. Via the pump, uncondensed gases are discharged for processing, for example to an incinerator.

The cooling surface of the condenser may comprise a cooling coil against which the vapour from the nucleation zone is frozen out. With a closed valve between the nucleation zone and the condenser it is then possible to introduce steam into the condenser, to melt the ice, with the option of pumping out the water from the condenser. In a further embodiment of a crystallization apparatus according to the present invention, the nucleation zone is connected, via a vapour compressor, to a condenser for condensing vapour, which has been fed to the condenser from the nucleation zone. The vapour compressor feeds vapour from the nucleation zone to the condenser at such a pressure that water vapour condenses against the cooling surface of the condenser. This condensate can be discharged continuously, so that periodic thawing is unnecessary.

The crystallization apparatus according to the present invention preferably comprises compression means for raising the pressure in the growth zone, so that evaporation there is suppressed. Said compression means can be formed by a liquid column of the growth zone, which preferably has a length of more than 10 meters. Thus, despite the nucleation zone communicating with the growth zone, separate nucleation and growth is obtained by simple means.

In a further embodiment of a crystallization apparatus according to the invention the growth zone comprises a stirring apparatus for the purpose of stirring the crystal slurry in horizontal planes. This stirring apparatus may comprise a number of stirring elements, such as stirring bars or stirring discs, which are positioned on a stirrer shaft and can be rotated past complementary stirring elements on the wall of the tank of the growth zone. The stirring apparatus stirs the crystal slurry in the horizontal planes, while said crystal slurry moves slowly vertically upwards under the influence of the upward pressure due to the crystal slurry fed in via the feed line at the bottom end of the growth zone. Preferably, a settling zone is formed at the bottom end of the growth zone, where the crystal slurry has a very low velocity, with a discharge line for discharging sediment. Preferably, continuous feed of crystal slurry takes place from the nucleation zone to the growth zone, and the crystal slurry fed in at the bottom end of the growth zone is introduced tangentially into the growth vessel.

The nucleation zone and the growth zone can be formed in one single vacuum vessel. The top rim of the tank which comprises the nucleation zone can open into an annular overflow section, the top rim of the tank being situated above the bottom of the annular overflow section. As the crystal slurry is pushed up, it will flow over the top rim of the tank into the annular section, situated lower down, of the overflow chamber, where seed crystals are also still formed. Consequently a supply of crystal slurry is formed, so that the suction side of the circulation pump in the delivery line is continuously supplied with crystal slurry.

Preferably, two or more crystallization apparatuses according to the present invention are connected to one another so as to form a multistage countercurrent freezeconcentration apparatus. In this arrangement, the top end of the growth zone of a second crystallization apparatus is connected, via a crystal slurry discharge line and via a liquid feed line, to the bottom end of the growth zone of the first crystallization apparatus. Via the crystal slurry discharge line, crystals are discharged from the second crystallization apparatus to the first crystallization apparatus, and via the liquid feed line liquid is fed from the first crystallization apparatus to the second crystallization apparatus. The liquid from the upstream stage is pumped into the nucleation zone or "boiling zone", the level in the growth vessel of the second crystallization apparatus thus being maintained. At the top end of the growth vessel directly above the stirred section, crystal slurry is pumped off to the upstream crystallization apparatus, so that the agitator will keep turning in the crystal slurry at all times. If a number of crystallization apparatuses according to the present invention are connected in series, the concentration of the solution will increase in a direction counter to the stream of ice crystals through the crystallization apparatus. The crystal slurry of the first stage of a number of connected crystallization apparatuses can be fed to a separation device such as a packed-bed wash column. Prior to separation in such a wash column, the crystal slurry can be mixed with the feed in a mixing vessel, to lower the viscosity and concentration, so that the conditions are as favourable as possible for separation of the crystals in the wash column.

An embodiment of the crystallization apparatus according to the present invention will be explained in more detail, by way of example, with reference to the accompanying drawing, in which:

FIG. 1 shows a schematic longitudinal section of a crystallization apparatus according to the present invention, FIG. 2 shows a condenser which can be connected to a crystallization apparatus according to FIG. 1, and FIG. 3 shows a schematic depiction of three identical crystallization apparatuses according to the invention connected countercurrently.

FIG. 1 shows a crystallization apparatus 1 according to the present invention including a ripening tank 2 and a vacuum vessel 3 connected thereto. Located in the ripening tank 2 is a growth zone 4 for growth of crystals which have been formed in a nucleation zone 5 which is in part situated in the topmost section 6 of the ripening tank 2 and in part within the vacuum vessel 3, to a size of about 350 μm. The ripening tank 2 comprises, for example, a column having a length of 10 meters and a diameter of between 2 and 4 meters. The top rim 9' of the ripening tank 2 projects above the bottom 7 of the vacuum vessel 3. The top rim 9' of the ripening tank 2 comprises a number of crenellations 9, between which the ice slurry is transferred from the nucleation zone 5 to an annular overflow chamber 8.

A stirrer 10 is positioned so as to be rotatable around a vertical axis 11 of the ripening tank 2 and comprises a number of discs or rods 12 which can be rotated in horizontal planes past complementary discs or rods 12' on the wall of the tank 2. The stirrer 10 is driven by means of a motor 12.

The bottom end of the annular overflow chamber 8 of the nucleation zone 5 is connected, via a delivery line 13 and a circulation pump 14, to an intake 13' at the bottom end 15 of the ripening tank 2. At the bottom end 15 of the ripening tank 2 a separation zone 16 is formed where undissolved fractions can precipitate from the feed and can be removed from the separation zone 16 via a discharge line 17.

In the nucleation zone 5 heat is extracted from the liquid by evaporation in vacuo, which can amount to, for example, $10^{-4}$ and $7 \cdot 10^{-3}$ bar, so that seed crystals having a size of between 5 μm and 10 μm are formed. These crystals are continuously fed, via the delivery line 13 and the circulation pump 14, to the bottom end 15 of the ripening tank 2. This causes the crystal slurry in the growth zone 4 of the ripening tank 2 to move slowly in a vertical direction. The stirrer 10 stirs the crystal slurry in horizontal planes, while it moves vertically upwards. The vertical velocity of the crystal slurry is so low that solids can settle and can be pumped off via the discharge line 17. At the top end 19 of the ripening tank 2, the crystals are discharged from the ripening tank 2 via a crystal slurry discharge line 20 to a separation device or to a crystallization apparatus of an upstream stage. Via a liquid feed line 21, liquid is fed in from a feed vessel or from a crystallization apparatus of an upstream stage.

By liquid being fed in via the liquid feed line 21, the level in the ripening tank 2 is maintained, while the discharge of the crystals directly above the stirrer 10 via the crystal slurry discharge line 20 takes place at such a flow rate that the stirrer 10 keeps turning continuously in the ice slurry.

It is possible, if the crystallization apparatus 1 is used in a multistage arrangement, for a crystal slurry discharge line 20' of a downstream crystallization apparatus to debouch at the bottom end 15 of the ripening tank 2. Liquid is in that case discharged from the crystallization apparatus 1 to a downstream crystallization apparatus via liquid feed line 21'.

For the purpose of sedimentation of solid particles from the liquid in the separation zone 16 it is important that the lines 20, 20', 21, 21' and also the connection of delivery line 13 at the bottom end 15 of the ripening tank 2 be situated in a horizontal plane, so that solid particles will not accumulate in the lines and so that minimal vortex formation takes place in the crystal slurry. Furthermore, the speed of the stirrer 10 should be kept low so as not to cause undesirable vortex formation, which could keep solid particles in suspension.

FIG. 2 shows a condenser 30 which, via a line 31 containing a valve 32, is connected to the vacuum vessel 3. The condenser 30 comprises a cooling coil 33 in which a coolant is circulated. While valve 32 is closed, the condenser 30 is evacuated via a pump 34. Then the valve 32 is opened and the vapour is able, under the influence of the pressure gradient, to move from the vacuum vessel 3 to the condenser 30. There the vapour freezes against the cooling coil 33. The uncondensed gases are discharged via the pump 34, for example to an incinerator. Then the valve 32 is closed, cooling is stopped, and steam is introduced into the condenser 30 via a steam feed line 36. This causes the vapour frozen against the cooling coil 33 to melt. The condensate and the melt are discharged from the condenser 30 via discharge line 35. Then cooling is restarted, and valve 32 is opened to keep the vacuum vessel 3 at reduced pressure.

FIG. 3, finally, shows a three stage countercurrent cryoconcentration apparatus having three stages I, II and III, each including a crystallization apparatus 1, 1', 1" according to the present invention. From a feed vessel 40, liquid such as, for example, industrial waste water or other types of effluent to be treated, such as sewage, are fed via the liquid feed line 21 to the crystallization apparatus 1 of the first stage I. The crystals such as, for example, ice which are discharged via the crystal slurry discharge line 20 are fed to a mixing vessel 41 where the ice is mixed with feed liquid from the vessel 40. The concentration and the viscosity of the crystal slurry in the mixing vessel 41 are thus adjusted to the conditions required for optimum separation in separation device 42. The separation device 42 preferably comprises a packed-bed wash column from which the crystals, in suspension or in the molten state, are discharged at atmospheric pressure via a line 43 and of which the liquid, via a line 44, is fed to the crystallization apparatus of the first stage. The feed moves from the feed vessel 40 through the successive stages I, II and III of the cryoconcentration apparatus, the concentration increasing for each stage I, II and II. At the bottom end of the last stage III the liquid is removed from the last stage via a discharge line 45 and fed to a processing facility. Via the crystal feed lines 20, 20', 20" the crystals move in countercurrent to the feed which flows through the lines 21, 21', 21".

Using the apparatus according to the invention it is possible, in an effective and simple manner, to concentrate industrial waste water or other types of effluent and ultimately feed them, via lines 45, to a processing facility such as, for example, an incinerator. The sediment drawn off at the bottom ends of the crystallization apparatuses 1, 1" via discharge lines 17–17" can likewise be fed to the processing facility.

What is claimed is:

1. A device for the crystallization of a liquid feed, comprising:
    a) an elongated tank having zones for crystal growth and nucleation, wherein mass transfer is permitted from the growth zone to the nucleation zone, said nucleation zone being located above said crystal growth zone;
    b) a delivery line for feeding the lower end of the tank with a mixture of liquid and crystals from the upper end; and
    c) a feed line for supplying the feed to the tank and a crystal slurry discharge line for removing crystal slurry from the tank, said feed line being connected to said tank at a first location and said discharge line being connected to said tank at a second location, said first location being above said second location.

2. Method for crystallizing a liquid from a solution, a mixture of liquids or a suspension, the method employing a crystallization device according to claim 1 and comprising the steps of
    feeding the solution to a vacuum vessel near the top end of the vessel,
    applying a partial vacuum near the top end of the vacuum vessel, applying excess pressure near the bottom end of the vacuum vessel, transferring the crystal slurry from the top end to the bottom end of the vessel and discharging the crystal slurry from the vessel, near the bottom end of the vacuum vessel.

3. A method according to claim 2, wherein the crystal slurry is transferred continuously from the top end to the bottom end.

4. A method according to claim 2, wherein the crystal slurry in the vacuum vessel is stirred in primarily horizontal planes, sediment being removed at the bottom end of the vacuum vessel.

5. A method according to claim 2, wherein crystals are discharged to the bottom end of a first vacuum vessel from the top end of a second vacuum vessel, and solution is fed to the top of the second vacuum vessel from the bottom end of the first vacuum vessel and wherein solution is discharged to from the bottom end of the second vacuum vessel to the top end of a third vacuum vessel, and crystals are fed from the top end of the third vacuum vessel to the bottom end of the second vacuum vessel.

6. Method according to claim 2, wherein the solution comprises effluent from a separate process, optionally from a styrene monomer or propylene oxide production process.

7. A crystallization device as in claim 6 wherein said first and second locations are in said nucleation zone.

8. A crystallization device as in claim 6 wherein said first and second locations are in an upper portion of said growth zone.

9. A crystallization device as in claim 6 wherein said first location is in said nucleation zone and said second location is in an upper portion of said growth zone.

10. A crystallization device as in claim 6, further comprising a means for causing evaporation in said nucleation zone.

11. A crystallization device as in claim 6, further comprising a vacuum apparatus being connected to the nucleation zone for reducing pressure in said nucleation zone.

12. A crystallization device as in claim 6, further comprising a cooling element for lowering temperature in said nucleation zone.

13. A crystallization device as in claim 6, further comprising a condenser having a valve for receiving and condensing vapor from said nucleation zone, said valve closing to permit uncondensed vapor and condensate to be discharged to a remote location.

14. A device for the crystallization of a liquid feed, comprising:
  a) an elongated tank having:
    i) a crystal growth zone; and
    ii) a nucleation zone located above said crystal growth zone and having a cooling unit;
  wherein mass transfer is permitted between said crystal growth and nucleation zones;
  b) a delivery line for feeding a mixture of liquid and crystals to the growth zone from an upper end of the elongated tank; and,
  c) a feed line for supplying the feed to the tank; and
  d) a crystal slurry discharge line for removing crystal slurry from the tank; said feed line being connected to said tank at first location and said discharge line being connected to said tank at a second location, said first location being above said second location.

15. A device as in claim 14, wherein the nucleation zone is provided with an evaporation means for evaporating liquid in the nucleation zone.

16. A device as in claim 15, wherein the evaporation means comprises a vacuum apparatus being connected to the nucleation zone to reduce pressure in the nucleation zone.

17. A device as in claim 16, wherein said pressure in the nucleation zone is reduced below $7.10^{-3}$ bar.

18. A device as in claim 17, wherein said pressure in the nucleation zone is reduced between $10^{-4}$ and $7.10^{-3}$ bar.

19. A device as in claim 15, wherein the nucleation zone is connected by a valve to a condenser for condensing vapor, the vapor being fed to the condenser from the nucleation zone and contacting a cooling surface of the condenser.

20. A device as in claim 19, wherein a steam feed line is connected to the condenser for introducing steam into the condenser when the valve is closed.

21. A device as in claim 20, wherein the cooling surface of the condenser freezes the vapor and the condenser has a pump for discharging uncondensed gases.

22. A device as in claim 15, wherein the nucleation zone is connected by a vapor compressor to a condenser for condensing vapor, the vapor being fed to the condenser from the nucleation zone and contacting a cooling surface of the condenser at a relatively high pressure in the condenser.

23. A device as in claim 15, wherein the growth zone further comprises a compression means for raising the pressure in the growth zone.

24. A device as in claim 23, wherein the compression means is formed by a liquid column in the growth zone.

25. A device as in claim 24, wherein the column has a length of more than 10 meters.

26. A device as in claim 14, further comprising a stirring apparatus in the growth zone for stirring the crystal slurry in the growth zone in horizontal planes.

27. A device as in claim 26, wherein said stirring apparatus comprises a stirrer having stirring elements being positioned on a stirrer shaft and rotatable past corresponding stirring elements positioned on an inner wall of the tank in the growth zone.

28. A device as in claim 14, further comprising a discharge line for discharging sediment located at a lower end of the growth zone wherein the crystal slurry has very low velocity.

29. A device as in claim 14, wherein a crystal slurry is continuously fed from the nucleation zone to the growth zone by the delivery line.

30. A device as in claim 14, wherein the nucleation zone and the growth zone are situated in a single vacuum vessel.

31. A device as in claim 30, wherein the upper end of the growth zone of the first device is connected to a separation device for receiving a crystal slurry.

32. A device as in claim 14, wherein said tank further comprises an annular overflow trough, and wherein the tank has an open top end having a top rim, said top rim being situated above the bottom of the annular overflow trough.

33. A device as in claim 32, wherein at least one more comparable device is connected in series with the first and second devices.

34. A device as in claim 33, wherein the separation device comprises a wash column.

35. A device as in claim 14, being connected to a second comparable device, wherein an upper end of the growth zone of the second device is connected by a crystal discharge line and by a liquid feed line to the lower end of the growth zone of the first device for discharging crystals from the second device to the first device and for feeding liquid from the first device to the second device.

36. A device as in claim 14, wherein a plurality of comparable devices are connected, whereby the crystal slurry moves countercurrently to the solution stream whose concentration is increasing.

* * * * *